United States Patent [19]

Kuwata et al.

[11] 4,409,739
[45] Oct. 18, 1983

[54] EROSION RESISTANT GAS DISTRIBUTOR AND A METHOD FOR MINIMIZING EROSION

[75] Inventors: Masayoshi Kuwata, Ballston Lake; Fred W. Staub, Schenectady, both of N.Y.

[73] Assignee: General Electric Company, Schenectady, N.Y.

[21] Appl. No.: 298,698

[22] Filed: Sep. 2, 1981

[51] Int. Cl.³ ............................................. F26B 3/08
[52] U.S. Cl. ..................................... 34/10; 34/57 A; 432/15; 432/58
[58] Field of Search ............... 34/10, 57 A, 57 B, 231; 122/4 D; 110/245; 432/15, 58

[56] References Cited

U.S. PATENT DOCUMENTS 4,115,929  9/1978  Staub ........................................ 34/10

FOREIGN PATENT DOCUMENTS 1431763  4/1976  United Kingdom .

*Primary Examiner*—Larry I. Schwartz
*Attorney, Agent, or Firm*—Paul J. Checkovich; James C. Davis, Jr.; Marvin Snyder

[57] ABSTRACT

A gas distributor for fluidizing a bed of particulate matter which provides for minimum dissipation of particle energy from a particulate-laden gas stream on a distributor surface is disclosed. The gas distributor allows the particulate-laden gas stream to contact the surfaces of the distributor at about 90° or 0° which are angles of impact for low erosion. Opposing particulate-laden gas streams are made to contact each other which removes particle kinetic energy while minimizing erosion before fluidizing the bed of particulate matter.

A method to minimize erosion of a gas distributor for fluidizing a bed of particulate matter from a particulate-laden gas stream is also disclosed.

15 Claims, 3 Drawing Figures

EROSION RESISTANT GAS DISTRIBUTOR AND A METHOD FOR MINIMIZING EROSION

This invention relates to a gas distributor for fluidizing a bed of particulate matter. More specifically, it relates to an erosion resistant gas distributor for fluidizing a bed of particulate matter wherein the fluidizing gas stream contains particulate matter. Fluidization is a technique for rendering a bed of particulate matter into a suspension fluid by introducing a gas flow through the bed of matter.

As the cost of energy increases, it may become feasible to recover some of the useable heat, which was formerly discarded into the environment, from commercial waste process streams. These waste process streams may contain particulate matter which can be very erosive. An example of a recovery process is a system for waste heat recovery from industrial gas streams, such as the gas stream resulting from the burning of solids and solvents which are waste products in the manufacture of plastics. The resulting oxidation of some metals produces particles of metal oxides which are carried along with the waste gas stream. When this waste gas stream is used as the fluidizing medium, the particles of metal oxides will cause erosion of the distributor surfaces which they impact especially since the waste gas stream from such process is introduced into the gas distributor at temperatures as high as 1800° F. or more.

A fluidized bed is well-adapted to waste heat recovery systems because of its high heat transfer capabilities. The bed may be in heat flow communication with a waste heat recovery means such as a heat exchanger. The bed material itself requires the support of a gas distributor that will not foul with particles and that will not suffer from excessive erosion in spite of the high local gas velocity present in the distributor. The gas velocities in the distributor need to be large enough to prevent the adhesion of particulate matter to critical surfaces. However, the greater the velocity of the fluidizing gas stream, the greater the erosive effects of the particulate matter carried along therewith. But if the gas velocity through the distributor is too low, there will be insufficient gas flow therethrough to maintain the bed of particulate matter in a fluidized state.

It is known that a particle collision angle with a surface of about 20°–30° will yield a maximum amount of surface erosion whereas a right angle or close to 0° angle of impingement on a surface will cause a milder erosion of the surface.

A gas distributor for fluidizing a bed of particulate matter is disclosed in Staub et al., U.S. Pat. No. 4,115,929, issued Sept. 26, 1978. As shown in FIGS. 1 and 2 of the 4,115,929 patent, if the gas distributor thereof were to be used with a particulate laden gas stream, a portion of the stream would enter the distributor between the troughs and impinge directly on the inside of the apex of the baffles thus causing severe erosion of the baffles. The component erosion to which U.S. Pat. No. 4,115,929 refers is in part the erosion caused by particles of the fluidized bed scrubbing the upper side of the baffles 14 as shown therein in FIG. 2 by the flow stream arrows in the area of reference designation 26 and not erosion from particulate matter in the fluidizing gas stream with which it was not designed to operate.

SUMMARY OF THE INVENTION

It is an object of the present invention to provide a gas distributor for fluidizing a bed of particulate matter wherein the gas distributor which supports the material of the bed is subjected to minimum erosion from a fluidizing particulate-laden gas stream.

It is a further object of the present invention to provide a method for minimizing erosion to a gas distributor of a fluidized bed from a particulate-laden gas stream used to fluidize the bed.

In accordance with the present invention, an erosion resistant gas distributor for fluidizing a bed of particulate matter which provides for minimum dissipation of particle energy from a particulate laden gas stream on a distributor surface comprises a pair of baffles laterally disposed and spaced from each other to form a gas passage therebetween wherein the passage has a gas output side adapted to provide gas flow communication with the bed of particulate matter and a trough disposed on the gas input side of the passage and spaced from the pair of baffles to form a means for gas communication between the gas input side of the passage and an input side of the gas distributor in order to fluidize the bed of particulate matter and to direct entering gas to flow through the means for gas communication in a direction substantially parallel to the baffles before entering the passage. The maximum particle kinetic energy is allowed to dissipate into the bed of particulate matter. The gas velocity is either reduced through the gas distributor as its kinetic energy is dissipated in opposing gas stream or the particle energy is dissipated onto a semi-stagnant particle layer with a substantially right angle impingement on a distributor surface to minimize the erosive effects of the particulate matter. Cooling means for the gas distributor is provided.

A method of waste heat recovery from a particulate-laden gas stream comprises the steps of directing the particulate laden gas stream into gas flow communication with a distributor for fluidizing a bed of particulate matter such that the flow of the particulate-laden gas stream is substantially perpendicular to the surfaces of the gas distributor on which it impinges, passing the particulate-laden gas stream through the distributor and into heat flow communication with the bed of particulate matter and removing at least a portion of the heat from the bed of particulate matter. Additionally, it is desirable to redirect a portion of the particulate-laden gas stream such that it is substantially parallel to the surfaces of the gas distributor which it contacts. It is also desirable to form the particulate-laden gas stream into first and second portions and to cause these portions to contact each other from opposing directions, thereby reducing the kinetic energy of the entire stream.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1:
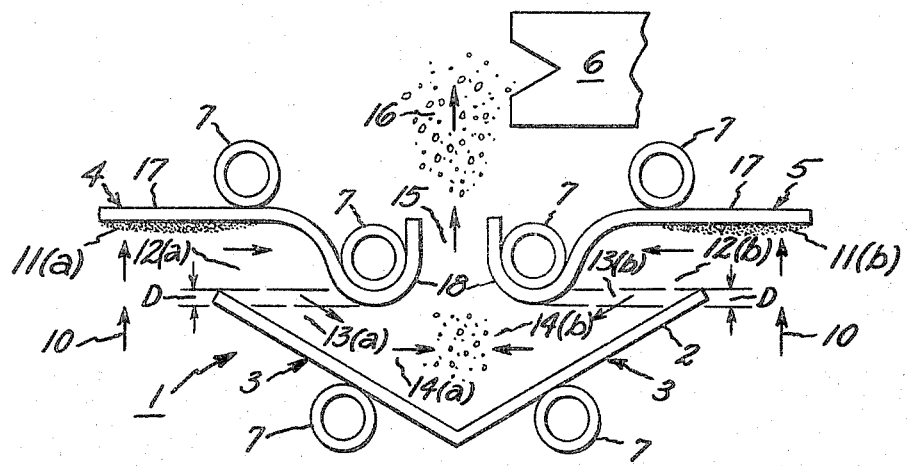
FIG. 1 is an end view of a gas distributor for fluidizing a bed of particulate matter made in accordance with the present invention.

FIG. 1 shows a gas distributor for fluidizing a bed of particulate matter made in accordance with the present invention. The operation of the gas distributor will be discussed as it is used in a fluidized bed waste heat recovery process.

As an example and not by way of limitation, a gas distributor for fluidizing a bed of particulate matter may be used in the recovery of heat from the combustion stream resulting from the incineration of waste solids and solvents used in the manufacture of plastics. These waste products can be oxidized to form particles of metal oxides and other materials. Metal oxides can be hard and very abrasive. The waste gas temperature from such oxidation processes can be typically 1800° F., although the gas distributor of the present invention would operate at gas temperatures up to about 2500° F. to 3000° F. A portion of the heat capacity of the waste gas stream is recoverable by using the gas stream to fluidize a bed which is in heat flow communication with a heat extraction means.

The bed of material to be fluidized is supported by a gas distributor which will be subject to erosion from any particulate matter carried along with the waste gas stream used to fluidize the bed. The gas distributor of the present invention is intended to minimize these erosive effects.

The erosion resistant gas distributor 1 of the present invention comprises a pair of baffles 4 and 5 and a trough 2. The baffles 4 and 5 are laterally disposed and spaced from each other to form a gas passage 15 therebetween. The baffles 4 and 5 and trough 2 may be made from a variety of metals such as steel or cast iron. The passage 15 has a gas output side adapted to provide gas flow communication with a bed of particulate matter 16. Heat extraction means 6, such as a heat exchanger wherein a portion of the waste heat may be recovered, is provided in heat flow communication with the fluidized bed of particulate matter 16. The trough 2 is disposed on the gas input side of the passage 15 and spaced from the pair of baffles 4 and 5 to form a passage 12, 13, 14 for gas communication between the gas input side of the passage 15 and a source of fluidizing gas 10. The trough 2 is further disposed to force the gas 10 entering the distributor to flow through the passage 12, 13, 14 for gas communication with the input of the passage 15 before entering the passage. This arrangement of the trough 2 constrains the gas 10 entering the distributor to follow the flow path indicated by the arrows shown in passageway 11-15 in order to enter the bed of particulate matter 16 and prevents a direct entry of the gas into the bed of particulate matter. The letters a and b in parentheses denote analogous portions of the gas flow in alternative flow paths through the gas distributor 1.

Figure 2:
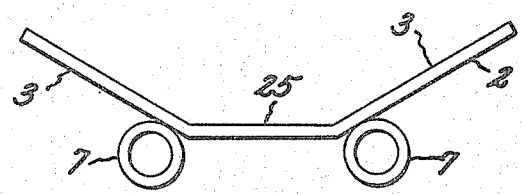
FIG. 2 is an end view of an alternate configuration of a trough which may be used with the gas distributor as shown in FIG. 1.

The trough 2 may be V-shaped and may be made in one piece or by joining two pieces together to form the sides 3 thereof. An alternate configuration for the trough 2 is shown in FIG. 2 wherein the sides 3 thereof are connected at the lower ends thereof by a lateral member 25. Of course the trough 2 of this configuration could be made in one piece. Preferably the trough 2 is centered about the vertical axis of the passage 15 such that symmetrical flow paths in passages 12-14(a) and (b) are created. The symmetry tends to create a uniform pattern of erosion along each flow path through the distributor.

The gas distributor is generally oriented in a substantially horizontal position during operation. In order to prevent the material of the fluidized bed 16 from falling through the distributor when the fluidizing gas flow therethrough is stopped, the baffles 4 and 5 may further comprise at least an upper portion 17 and a lower portion 18 with respect to a vertical axis wherein the lower portion 18 is nearer the passage 15. The ends of the sides 3 of the trough 2 may be extended upward beyond the horizontal extension of the lower portion 18 of the baffles 4 and 5 such that the dimension D is greater than zero. This will form a positive particle trap and help prevent bed material from falling through the gas distributor when the fluidizing gas flow is stopped.

There is a tradeoff which must be addressed in the design of a gas distributor. If the particulate laden gas stream is forced at high velocity through the distributor, the surfacing and scrubbing action of the particulate matter will increase the erosive effects due to the increased kinetic energy. However, if the velocity of the particulate laden gas stream is too slow, reducing the erosive effects, the particulate matter will adhere to and collect between the distributor components and thereby foul the gas passages of the distributor.

In operation, a fluidizing gas stream 10 which may contain particulate matter is caused to enter the gas distributor. The gas is accelerated as it passes through the gas distributor due to a decrease in flow area from the gas input at source 10 to the gas output at passage 15 at which point the maximum gas velocity in the gas distributor is reached. Preferably, the entry gas 10 velocity is about one-third of the output gas velocity at passage 15 in order to limit erosion damage to the distributor surfaces. The gas flow path will be described for the path designated by subscript a. An analogous path is followed by the gas proceeding along the path designated by subscript b wherein the same number is used to indicate analogous events. It is known that a particle collision angle with a surface of about 20°-30° will yield a maximum amount of surface erosion whereas a right angle or close to 0° angle of impingement on a surface will cause a milder erosion of the surface.

The input particulate laden gas stream 10 impacts the baffle 4 at passage 11(a) at approximately 90° and thus is relatively mild for erosion. There may be a layer of particles adhering to the baffle 4 at this point which acts as a shield from erosion. In addition, a cloud of semi-stagnant particles in passageway 11(a) caused by the change in direction of the gas flow thereat will further serve to shield the baffle 4 from erosion. A portion of the gas stream is caused to flow in the direction of the arrow in passage 12(a). The gas flow in passages 12(a) and 13(a) is substantially parallel to the baffle 4 and side 3 of the trough 2 thus minimizing the erosion to the surfaces from particulate matter carried therealong since the angle of impact is close to 0°. As the gas flow nears the entrance of the passage 15 in passage 14(a), it is met by an opposing gas flow from passage 14(b). The particulate matter moving along with the gas flows in these opposing directions tends to collide, thus giving up some of the kinetic energy thereof. No material erosive effects to the gas distributor are occasioned by this collision of oppositely flowing gas streams and particulate matter at passage 14. The combined gas streams in passage 14 are further accelerated by a decrease in the flow area through the passage 15 and into the bed of material 16 to be fluidized. The gas and particulate matter flow at passage 15 is substantially parallel to the vertical surfaces of the baffles 4 and 5 and thus no material erosion of these surfaces occurs. The gas velocity as it exits passage 15, is at its maximum for the distributor and should be selected to ensure a good fluidized condition for the bed of particulate matter to be fluidized. A heat extraction means, such as a heat exchanger 6, may be provided in heat flow communication with the fluidized material 16. The heat transfer flow in the heat recovery process is thus substantially from the hot waste gas used to fluidize the bed of particulate matter to the fluidized bed of material and then to the heat extraction means. Cooling means 7, such as a pipe having liquid flowing through it, is preferably provided in heat flow communication with the baffles 4 and 5 and the trough 2 to further limit the erosive effects.

Figure 3:
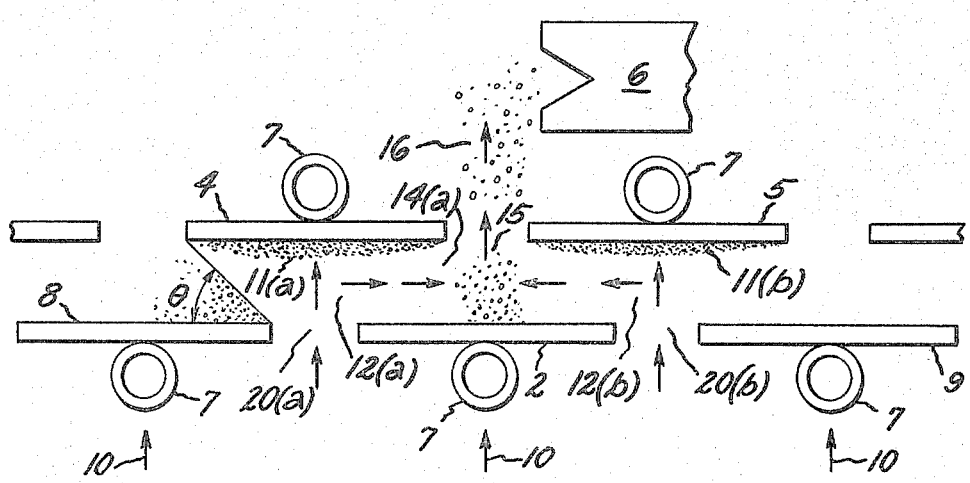
FIG. 3 is an end view of another embodiment of a gas distributor for fluidizing a bed of particulate matter which may be used with the method of the present invention.

An alternative configuration of a gas distributor useful with the method of the present invention is shown in FIG. 3. The distributor comprises a first layer having laterally disposed plates 8, 2 and 9 and a second layer having laterally disposed plates 4 and 5 which are substantially parallel to the plates of the first layer. The passageway through the distributor has been numbered such that the same number corresponds to an analogous portion of the configuration of FIG. 1.

A portion of the input particulate-laden gas stream 10 is accelerated by a decrease in the flow area at orifice 20(a) between the lateral surfaces of distributor plates 2 and 8. This gas and particulate flow is substantially parallel to the surfaces of the plates forming the orifice 20(a) and is designed to be fast enough so as not to permit the adhesion of any particulate matter thereto. As the particulate-laden gas stream impinges distributor plate 4 of passage 11(a), a portion of the stream is caused to flow in the direction of the arrow in passage 12(a). It is at this change in flow direction whereat large particles in the flow stream are separated from the gas stream due to their loss of velocity. The impact on the distributor plate 4 of passage 11(a) is approximately at 90° and thus results in relatively mild erosion. In addition, there may be a layer of particles aadhering to the distributor plate 4 of passage 11(a) and a cloud of semi-stagnant particles in passage 11(a) caused by the change in direction of the gas flow which will further reduce the erosive effects as hereinbefore described. The direction of flow in passage 12(a) is substantially parallel to the surfaces of the distributor plates 2 and 4 thereby causing the angle of impact of the particulate matter to be substantially 0° which minimizes the erosive effects of the particulate flow. In passage 14(a) the particulate-laden gas stream meets an opposing particulate-laden gas stream from 14(b) and vice-versa. The particles moving along with these gas streams in opposing directions tend to collide thus giving up some of their kinetic energy. No material erosive effects to the gas distributor are occasioned by these collisions. The combined gas streams in passage 14 are accelerated by a decrease in the flow area through the orifice 15 and exit the gas distributor into the fluidized bed material 16. The gas and particle flow in passage 15 is substantially parallel to the vertical surfaces of the plates 4 and 5 forming the orifice therebetween and thus no material erosion of these surfaces occurs. A heat extraction means 6 may be provided in heat flow communication with the material 16 of the fluidized bed as hereinbefore described. Cooling means 7 as hereinbefore described, is preferably provided in heat flow communication with the distributor plates to further reduce the erosive effects. For this distributor configuration the input gas 10 velocity is preferably about 0.2 times the exiting gas velocity at passage 15 and is typically in the range of about 0.05 to about 0.25 times the exiting gas velocity.

The localized flow velocities through the distributor as shown in FIG. 1 can be less than those through the distributor as shown in FIG. 3. In order to decrease the localized flow velocities and still maintain adequate flow velocity for fluidization, the spacing and thereby the flow area in passage 12(a) and (b) must be increased. With the configuration as shown in FIG. 1, the sides 3 of the trough 2 can be extended through dimension D to maintain the positive particle trap. For the configuration as shown in FIG. 3, as the plates 2 and 8 are moved away from plate 4 the angle $\theta$ between them increases. For practical operation, the angle $\theta$ must be less than the angle of repose of the material of the fluidized bed or the material will fall through the orifice 20(a) when the fluidizing gas flow through the distributor is stopped. The angle of repose is the angle with the horizontal at which material will stand when piled.

The configuration of FIG. 1 is preferred: where negligible loss, due to the particle trap, of particulate matter from the fluidized bed material is required when the gas flow through the distributor is stopped; where particle size in the waste gas stream is small; and where the local gas velocities in the distributor must be kept low. The configuration of FIG. 3 is preferred: where particle size in the waste gas stream is large; and where the loss of particulate from the material of the fluidized bed at passageway 12 through the orifice 20 is not excessive due to the angle of repose of the bed material and the relative spacing between the layers of the distributor plates when the gas flow through the distributor is stopped.

Thus a gas distributor for fluidizing a bed of particulate matter wherein the distributor is subjected to minimum erosion from a fluidizing particulate-laden gas stream has been described. Further a method for minimizing erosion to a gas distributor of a fluidized bed from a particulate-laden gas stream used to fluidize the bed has been described.

Although the preferred embodiments of the present invention have been described and illustrated, other configurations and modifications will become apparent from the foregoing to one skilled in the art. It is intended that the scope of this invention be limited only by the appended claims.

What is claimed is:

1. An erosion resistance gas distributor for fluidizing a bed of particulate matter with a particulate laden gas stream, comprising:
   (a) a pair of baffles laterally disposed and spaced from each other to form a gas passage therebetween, said passage having a gas input side and a gas output side adapted to provide gas flow communication with said bed of particulate matter; and
   (b) a trough disposed on said gas input side of said passage, spaced from said pair of baffles to form a means for gas communication between said gas input side of said passage and an input side of said gas distributor in order to fluidize said bed of particulate matter and to direct entering gas to flow through said means for gas communication in a direction substantially parallel to said baffles before entering said passage; wherein the surfaces facing said trough of each of said pair of baffles are flat and outwardly perpendicular to a vertical extension through the lateral margins of said trough.

2. An erosion resistant gas distributor as in claim 1 further comprising cooling means in heat flow communication with said trough and said pair of baffles wherein said cooling means in heat flow communication with said pair of baffles is situated in the gas output side of said passage.

3. An erosion resistant gas distributor as in claim 1 wherein said trough and each of said pair of baffles comprises elongated flat plates wherein said trough is parallel to each of said pair of baffles.

4. An erosion resistant gas distributor for fluidizing a bed of particulate matter with a particulate laden gas stream, comprising:
(a) a pair of baffles laterally disposed and spaced from each other to form a gas passage therebetween, said passage having a gas input side and a gas output side adapted to provide gas flow communication with said bed of particulate matter; and
(b) a trough disposed on said gas input side of said passage, spaced from said pair of baffles to form a means for gas communication between said gas input side of said passage and an input side of said gas distributor in order to fluidize said bad of particulate matter and to direct entering gas to flow through said means for gas communication in a direction substantially parallel to said baffles before entering said passage;
wherein the surfaces facing said trough of each of said pair of baffles are outwardly flat from a vertical extension through the lateral margins of said trough and further wherein the flat surface is outwardly perpendicular to said vertical extension and inwardly from said vertical extension each of said pair of baffles comprises an upper and a lower portion with respect to a vertical axis wherein said lower portion is nearer said passage and further wherein the sides of said trough are extended to a vertical level above the horizontal extension of said lower portion of said pair of baffles in order to form a positive particle trap.

5. A method of recovering heat from a particulate laden gas stream comprising the steps of:
(a) directing said particulate laden gas stream into gas flow communication with a distributor comprising at least a pair of baffles each having a flat surface transverse to said particulate laden gas stream and a trough for fluidizing a bed of particulate matter such that said particulate laden gas stream is divided into first and second portions by said trough wherein said first and second portions first impinging respectively one of said pair of baffles on said flat surface and further such that said respective portion of said particulate laden gas stream is substantially perpendicular to each of said flat surfaces which it first impinges;
(b) passing said particulate laden gas stream through said distributor and into heat flow communication with said bed of particulate matter; and
(c) removing at least a portion of the heat from said bed of particulate matter.

6. The method as in claim 5 further comprising the step of redirecting a portion of said particulate-laden gas stream such that said portion of said particulate-laden gas stream is substantially parallel to the surfaces of said gas distributor which it contacts.

7. The method as in claim 5 further comprising the step of forming said particulate-laden gas stream into first and second portions thereof and causing said first and second portions to contact each other from opposing directions.

8. The method as in claim 5 further comprising the step of accelerating said particulate-laden gas stream as it flows through said gas distributor such that the gas velocity into said bed of particulate matter is sufficient to maintain said bed in a fluidized condition.

9. The method as in claim 8 wherein the velocity of said particulate-laden gas stream entering said gas distributor is about 0.2 times the velocity of said particulate-laden gas stream leaving said gas distributor.

10. The method as in claim 8 wherein the velocity of said particulate laden gas stream entering said gas distributor is in the range of about 0.05 to 0.25 times the velocity of said particulate-laden gas stream exiting said gas distributor.

11. The method as in claim 8 wherein the velocity of said particulate-laden gas stream entering said gas distributor is about one-third the velocity of said particulate laden gas stream exiting said gas distributor.

12. The method as in claim 5 further comprising the step of redirecting a portion of said particulate-laden gas stream while it is passing through said gas distributor such that said portion of said particulate-laden gas stream is alternately substantially parallel to and then substantially perpendicular to the surfaces of said gas distributor.

13. The method as in claim 5 further comprising the step of providing a cooling means in heat flow communication with said gas distributor.

14. The method as in claim 12 further comprising the step of forming said particulate-laden gas stream into first and second portions thereof and causing said first and second portions to contact each other from opposing directions.

15. The method as in claim 12 further comprising the step of accelerating said particulate-laden gas stream as it flows through said gas distributor such that the gas velocity into said bed of particulate matter is sufficient to maintain said bed in a fluidized condition.

* * * * *